United States Patent [19]

Barkley

[11] Patent Number: 4,637,738
[45] Date of Patent: Jan. 20, 1987

[54] ALIGNMENT COMPENSATOR FOR LINEAR BEARINGS

[76] Inventor: Vincent Barkley, 702 Oella Ave., Ellicott City, Md. 21043

[21] Appl. No.: 760,949

[22] Filed: Jul. 31, 1985

[51] Int. Cl.<sup>4</sup> ............................................. F16C 29/12
[52] U.S. Cl. ............................................. 384/38; 384/7
[58] Field of Search .............. 308/3 R, 3 A, 4 R, 6 R, 308/6 B, 6 C, 2 A; 384/192, 306, 309

[56] References Cited

U.S. PATENT DOCUMENTS

| | | | |
|---|---|---|---|
| 1,805,992 | 5/1931 | Michell | 384/306 |
| 3,290,949 | 12/1966 | Samet | 308/2 A |
| 4,040,679 | 8/1977 | Teramachi | 308/6 C |
| 4,264,112 | 4/1981 | Magnuson | 308/6 C |
| 4,527,840 | 7/1985 | Mogglestone et al. | 308/6 C |

FOREIGN PATENT DOCUMENTS

| | | | |
|---|---|---|---|
| 1353660 | 1/1964 | France | 384/306 |
| 1076227 | 7/1967 | United Kingdom | 308/5 R |
| 1328252 | 8/1973 | United Kingdom | 308/5 R |
| 222818 | 7/1968 | U.S.S.R. | 384/192 |

Primary Examiner—Stuart S. Levy
Assistant Examiner—Thomas R. Hannon
Attorney, Agent, or Firm—Lawrence J. Shurupoff

[57] ABSTRACT

An apparatus which provides lateral compensation through angular deflection is primarily intended to correct a lack of parallelism between a pair of misaligned support shafts. The compensating apparatus is preferably formed of an elastically deformable fatigue resistant material and includes a rigid central region for resisting compressive and tensile loads without significant deflection. The compensator is particularly adapted for use with precision uniaxial movement devices such as positioning tables, wayslides and carriages commonly found in manual, automatic and numerically controlled machinery.

17 Claims, 14 Drawing Figures

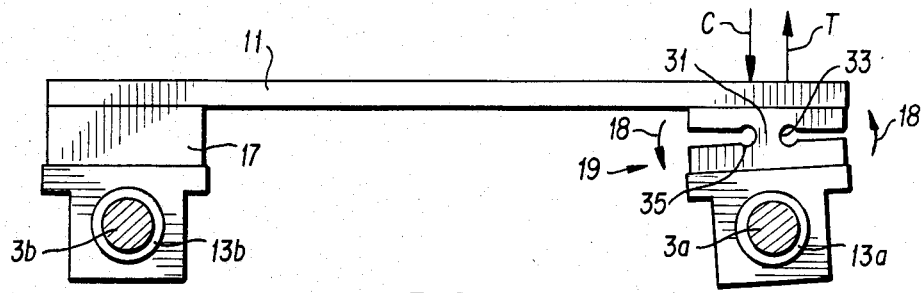
FIG. 3
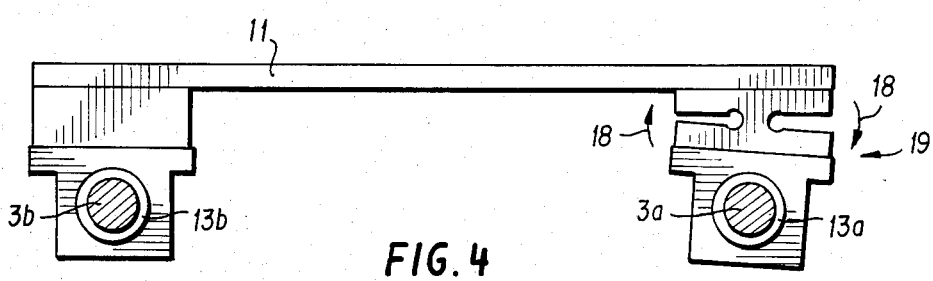
FIG. 4
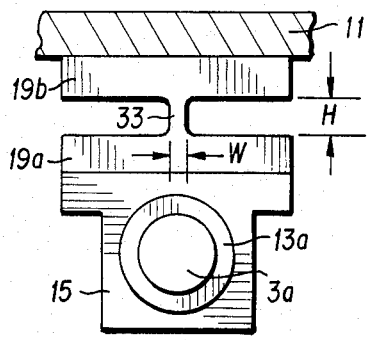
FIG. 5
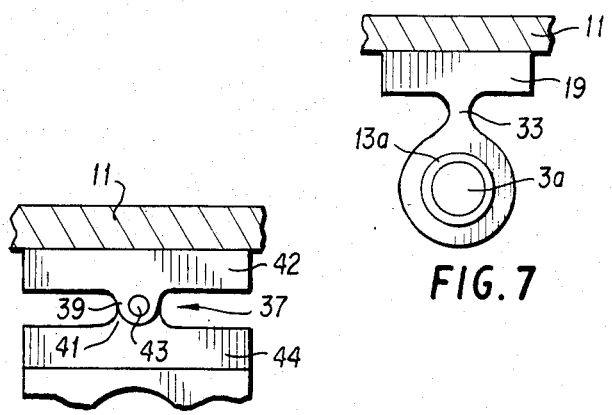
FIG. 6
FIG. 7
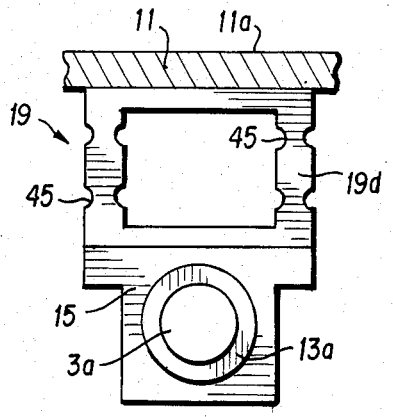
FIG. 8
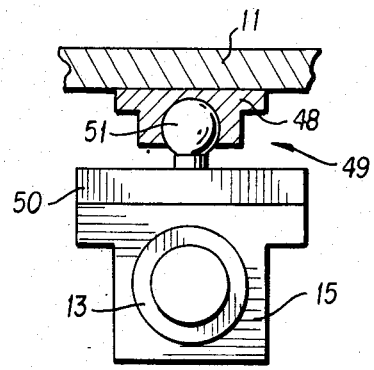
FIG. 9

ALIGNMENT COMPENSATOR FOR LINEAR BEARINGS

BACKGROUND OF THE INVENTION

1. Field of the Invention

This invention relates generally to the compensation of misalignment between substantially aligned supporting surfaces and more particularly concerns an apparatus which provides lateral compensation between a pair of misaligned shafts through angular deflection of a support member connected to one of the shafts.

2. Description of Prior Developments

Precision uniaxial movement devices, such as positioning tables, way slides, and carriages, used on manual, automatic, and numerical controlled machinery are known to require extreme accuracy of alignment during manufacture and assembly. In the case of positioning tables utilizing linear motion bearings and shafts, absolute parallelism and straightness of the shafts are required. Since this is in practice impossible to achieve, at other than a very high cost, the need has existed for a compensator which can accommodate lateral shaft misalignment, while maintaining the stiffness of the bearing system against compressive and tensile loading.

A source of shaft misalignment is known to originate from shaft nonlinearity wherein the straightness or cylindricity of the shaft is less than perfect. This misalignment results in a variation in the center to center distance between two aligned parallel shafts and can cause binding of linear bearings as they slide over the shaft surfaces. This variation and binding can occur even if the shafts are aligned as parallel as possible. In addition, a lack of parallelism between the two shafts, part tolerances and differential thermal expansion present further sources of shaft center to center distance variations.

The effects of such variations on non-compensated positioning systems include a lowering of the effective capacity of the bearings which slidably support the positioning table, greater wear and shorter life of moving and contacting components, greater friction resulting in greater drive force requirements and inconsistent performance of the positioning system.

Prior developments include two types of lateral compensators. The first type uses a linear motion bearing mounted in a cylinder of deformable material, such as rubber. While this provides a low cost lateral compensator, the device does not maintain the "vertical" stiffness of the bearing system. That is, the rubber cylinder readily deflects under compressive and tensile loading and often results in unacceptable distortion and displacement.

The second type of lateral compensator utilizes a precision linear slide to effect compensation. This however, represents a high cost solution to the problem.

While attempts have been made to eliminate center to center distance variations between a pair of substantially parallel shafts, such attempts have resulted in greatly increased system costs and have been less than completely satisfactory. Thus, a need exists for an economical compensator which will effectively compensate for lateral misalignment between a pair of substantially parallel supporting surfaces while actually reducing overall system costs while maintaining the stiffness of the bearing system against applied loads.

SUMMARY OF THE INVENTION

Accordingly, this invention has been made to overcome the problems described above and therefore has an object to provide an apparatus which compensates for lateral misalignment through adaptive angular motion of a compensating support member typically associated with a linear motion bearing.

Another object is to provide a compensator which will reduce the straightness requirements of shafts designed to slidably support positioning tables.

Yet another object is to provide a compensator which will reduce shaft parallelism requirements.

Still another object is to provide a compensator which will reduce positioning table assembly accuracy requirements thereby facilitating the manufacture and assembly of positioning devices.

Another object is to provide a compensator which will allow for a reduction in positioning table component part accuracy requirements thereby allowing for greater part tolerances and easier assembly.

Another object is to provide a compensator which will increase the overall system tolerance for differential thermal expansion within a positioning table system.

Yet another object is to provide a compensator which will increase the effective bearing capacity of positioning table systems.

Still another object is to provide a compensator which will reduce wear and friction between moving components within a positioning table system thereby increasing the useful life of the moving components, and reducing the system drive force requirements.

Another object is to provide a compensator which will increase the consistency in performance of assembled units.

Still another object is to provide a compensator of reduced cost which will prevent binding of a positioning table caused by a lack of parallism between aligned shafts.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein:

FIG. 3 is a partial sectional elevational view taken along lines III—III of FIG. 2 showing counterclockwise rotation of the linear bearing about the shaft;

FIG. 4 is a partial sectional elevational view taken along line IV—IV of FIG. 2 showing clockwise rotation of the linear bearing about the shaft;

FIG. 5 is an end elevational view of an alternate embodiment of the compensator adapted to serve as a pillow block;

FIG. 6 is an end elevational view of an another embodiment of the compensator using a hinged structure for angular adaptive movement;

FIG. 7 is an end elevational view of yet another embodiment wherein the compensator is formed integrally with the linear bearing;

FIG. 8 is an end elevational view of an embodiment of a dual compensator arrangement where the linear bearing is not adapted to rotate about the shaft;

FIG. 9 is an end elevational view of another embodiment using a spherical joint for added angular compensation;

DETAILED DESCRIPTION OF THE PREFERRED EMBODIMENT

Figure 1:
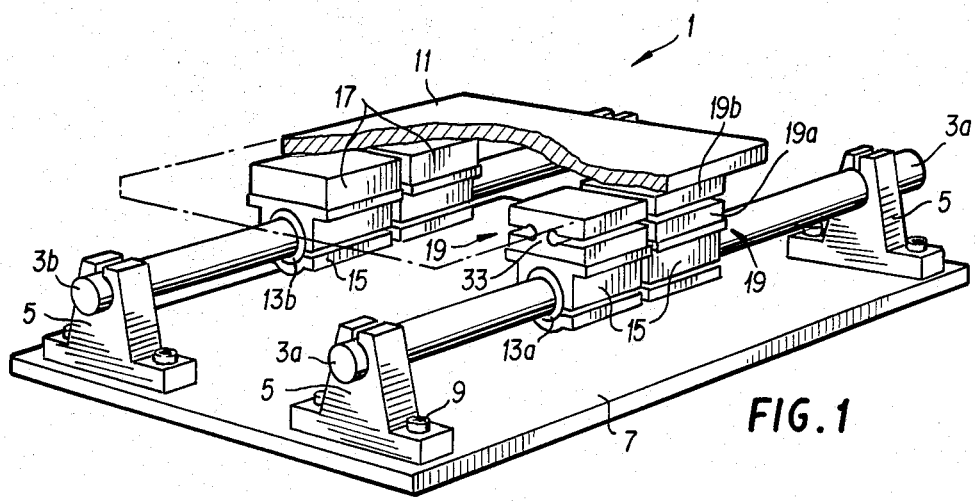
FIG. 1 is a perspective view, partly in section, of a pair of axially spaced compensators respectively fitted over a pair of linear bearings applied within a positioning table system.

The apparatus will now be described in connection with FIG. 1 within which, for example, a carriage assembly (1) is shown mounted over a pair of substantially parallel support members or shafts (3a, 3b). While circular shafts are shown, a support bar or shaft of any cross section may be used as long as the rest of the assembly is designed to accommodate such supports. The shafts may be rigidly secured within clamps (5) which in turn may be anchored to a support base (7) with fasteners (9).

A platform or carriage (11) is shown slidably fixed to the shafts via linear motion bearings (13a, 13b). The carriage may be part of a positioning table, robotic assembler, or similar device which requires accurate controlled movement. Two bearings are preferably mounted over each shaft as shown, although a single bearing may be mounted upon each shaft for some applications. The linear bearings are shown secured within pillow blocks (15) as is common in production assemblies. The pair of pillow blocks provided on shaft (3b) is shown rigidly secured to a lower surface of a solid mounting block (17) while the opposing pair of pillow blocks provided on shaft (3a) is shown secured to a pair of alignment compensators (19).

The blocks (17) and compensators (19) may be fixed to the pillow blocks using any standard threaded fastener. The compensator body (19) includes a lower section (19a) connected to an upper section (19b) via flexible column portion (33). The misalignment compensation provided by compensators (19) allows the adhesive attachment of the compensators and mounting blocks to the pillow blocks using commerically available adhesives such as epoxy resins, since relatively little shear force is generated between the pillow blocks and the compensators.

Figure 2:
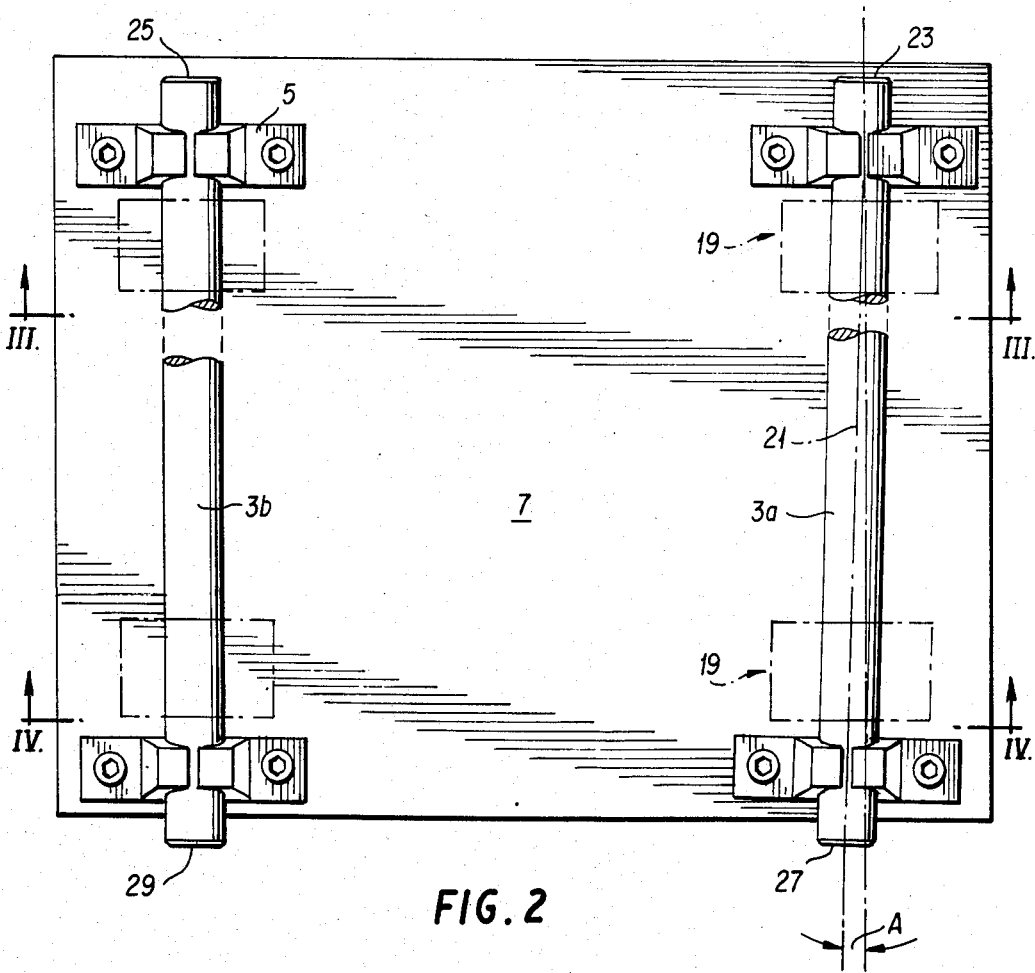
FIG. 2 is a simplified plan view, partly in section, of the compensated positioning system of FIG. 1, schematically showing a compensator in phantom at its axial endpoints on the shaft.

As shown in FIG. 2, perfect parallelism between a pair of aligned shafts is virtually impossible to achieve. There will almost always be some degree of misalignment between the shafts. This misalignment is represented in FIG. 2 by angle A which indicates that shaft (3a) is skewed with respect to shaft (3b). While a linear misalignment is shown, the compensator will also function satisfactorily over a curvilinear, wavy or bent shaft.

If the axial or longitudinal midpoint (21) of shaft (3a) is located at the correct intended lateral spacing from shaft (3b), then the end (23) of shaft (3a) will be spaced too far from end (25) of shaft (3b) while the opposite end (27) of shaft (3a) will be spaced too close to end (29) of shaft (3b) so that lateral compensation is required due to the shaft misalignment extending over angle A.

As shown by the curved directional arrows (18) in FIGS. 3 and 4, in order to accommodate and compensate for the undesired condition shown in FIG. 2, the alignment compensator (19) will undergo elastic angular deflection about pivot point (31) located within flexible column portion (33). The flexible column portion is designed to be substantially rigid to maintain close tolerances between the shaft and carriage under compressive and tensile column-type loading (respectively shown by arrows C and T) while allowing rotation about pivot point (31) with relatively little resistance. The compensator (19) is preferably formed of a resilient, fatigue resistant material capable of compressive or tensile loading across the flexible column portion (33) up to the static load limit of the bearings. For example, the compensator may be formed from a metal such as aluminum or a plastic such as nylon. The compensator may be extruded, cast, forged or machined from any suitable stock material.

The exact dimensions of the compensator will depend upon the loads and operating conditions to which it will be subject. These dimensions can be calculated using well known design methods to size the compensator to achieve a desired flexibility at a low force, to provide sufficient elastic deflection about its flexible column pivot point while keeping stresses within the fatigue strength of the compensator material, to select a cross section that will minimize stress concentrations, and to provide a section capable of column loading up to the static limit of the bearings. In general, to provide sufficient flexibility the width "W" of the flexible column portion (33) should be about ½ of its height "H" as shown in FIG. 5.

As further shown in FIGS. 3 and 4, a curved stress relief surface or channel (35) may be provided adjacent each side of column (33) to reduce bending stress, and to facilitate manufacture.

As shown in FIG. 5, the compensator may have a generally "H"-shaped cross section and may be formed homogeneously with pillow block section (15) so that adhesives or fasteners are obviated. An alternate embodiment of the invention is shown in FIG. 6 where a hinge (37) replaces the flexible column portion of the previous embodiment. The hinge is preferably a simple piano hinge having interdigitated members (39, 41) pivotally connected by a hinge pin (43). Members 39 and 41 extend from support elements 42, 44, respectively. This arrangement allows the use of relatively brittle metal materials having higher load carrying capacities.

Another form of the invention is shown in FIG. 7 where the compensator (19) is formed integrally with the bearing as in FIG. 5. However, the pillow block portion (15) is formed with a circular cross section leading to a "T" shaped cross section for minimizing the size of the compensator and bearing assembly where clearance, compactness and reduced weight are of concern.

In all of the embodiments discussed above, the compensators rotate slightly about the shaft as shown in FIGS. 3 and 4. In applications where the linear motion bearing (13a) could not tolerate this rotation, a radial bearing can be provided around the linear motion bearing. That is, a standard radial bearing could be fitted between the linear motion bearing and the compensator.

In applications where a radial bearing is unacceptable, the dual compensator (19d) shown in FIG. 8 could be employed. The dual compensator provides the desired four point deflection about the eight semi-cylindrical recessed surfaces of the four necked down regions (45) so that the linear motion bearing (13) will at all times remain parallel to the surface (11a) of platform (11). FIG. 14 depicts the deflection of this compensator in use. Alternatively, as seen in FIG. 13 each of the regions (45) of FIG. 8 could be replaced with a hinge (37) such as shown and described in FIG. 6 to achieve the same results.

While all of the above compensators are primarily intended for use with self aligning bearings, the aligning compensator (49) of FIG. 9 can be used with non-aligning bearings. The aligning compensator uses a spherical joint (51), such as a ball and socket joint to provide the necessary angular and lateral freedom while providing the desired stiff vertical support between support elements which respectively serve as socket member 48 and base member 50.

Figure 10:
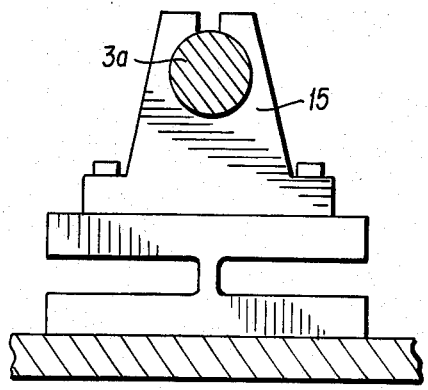
FIG. 10 is an end elevational view of a compensator serving as a support for a shaft mount.
Figure 11:
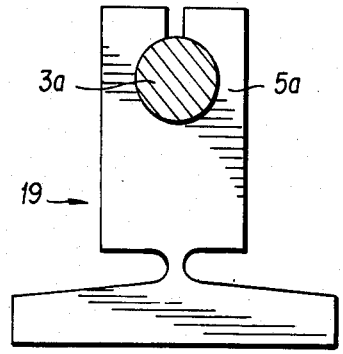
FIG. 11 is an end elevational view of a compensator formed with a mounting recess to receive a support shaft.
Figure 12:
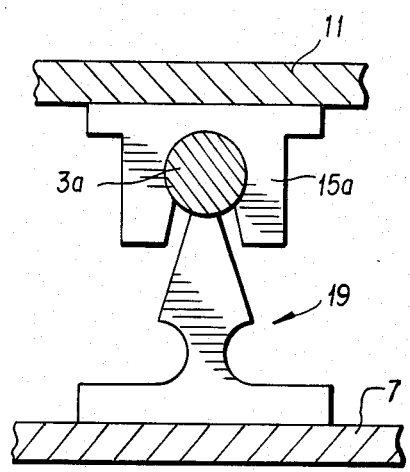
FIG. 12 is an end elevational view of a compensator adapted for use with an open pillow block.

All the compensator embodiments discussed above have been assumed to have been mounted inflexibly via rigid clamp mounts (5). In each embodiment however, the linear motion bearing can be mounted rigidly to the shaft and the compensators applied beneath the clamps as shown in FIG. 10 or directly to the shaft as in FIGS. 11 and 12. The embodiment of FIG. 11 is formed with a clamping portion (5a) while the embodiment of FIG. 12 is formed as a simple rail support adapted to support a rail within an open pillow block (15a).

Figure 13:
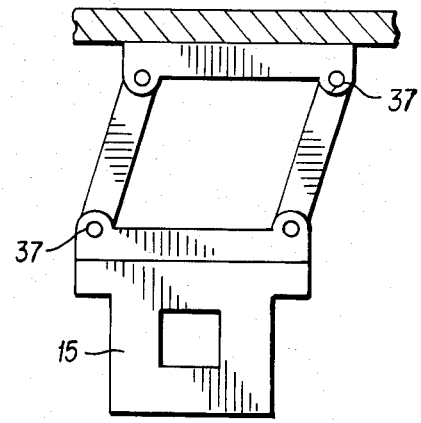
FIG. 13 is an end elevational view of a variation of the compensator shown in FIG. 8 wherein the elastic necked-down pivot regions have been replaced with relatively rigid hinges and hinge pins.
Figure 14:
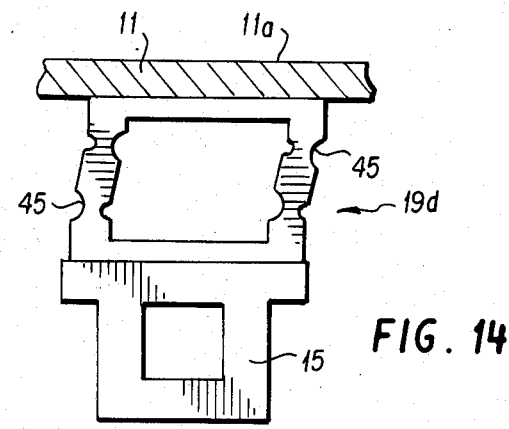
FIG. 14 is an end elevational view of the compensator of FIG. 8 showing the compensator in a pivoted compensating position.

As noted above, a variation of the compensator of FIG. 8 is shown in FIG. 13. This embodiment is intended for applications where rotation of the linear bearing or bushing would be unacceptable and where a radial bearing would be undesirable. In this case, a square shaft may be used and a corresponding square channel may be formed in the bearing. Such an assembly is provided with a plurality of pivots or hinges to provide for the desired alignment compensation. In the drawings it can be seen that the compensator pivot points are located on the exterior of the linear bearing and spaced apart therefrom.

Obviously, numerous modifications and variations of the present invention are possible in light of the above teachings. It is therefore to be understood that within the scope of the appended claims, the invention may be practiced otherwise than as specifically described herein.

I claim:

1. An alignment compensator for use with a linear bearing mounted on a first support member aligned substantially parallel with a second support member, the first and second support members supporting a movable carriage, said compensator comprising:
a body member formed of an elastically deformable material, said body member having angular deflection means for compensating for misalignment between said first and second support members via angular elastic deformation of said body member, said angular deflection means comprising substantially rigid support means for maintaining close tolerances between said carriage and said first and second support members.

2. The compensator of claim 1 wherein said angular deflection means comprises a portion of reduced cross section formed within said body member for facilitating said angular deflection about a predetermined pivot point.

3. The compensator of claim 2 wherein said pivot point is located within said rigid support means.

4. The compensator of claim 3 wherein said body member and said rigid support means are formed homogeneously from said elastically deformable material.

5. The compensator of claim 1 wherein said body member comprises a substantially H-shaped cross section.

6. The compensator of claim 1 wherein said body member comprises a T-shaped cross section.

7. The compensator of claim 1 wherein said body member comprises a pillow block for supporting said bearing.

8. The compensator of claim 1 wherein said angular deflection means comprises a first portion, a second portion, a third portion and a fourth portion each having a reduced cross section formed within said body member for facilitating said angular deflection about a first, a second, a third and a fourth pivot point, respectively.

9. The compensator of claim 1 wherein said body member is disposed between said first support member and said movable carriage.

10. The compensator of claim 1 wherein said body member is disposed to support said first support member without contacting said carriage.

11. The compensator of claim 1 wherein said body member further comprises mounting means for securing one of said support members to said compensator.

12. The compensator of claim 11 wherein said mounting means comprises a channel formed within said body member for clamping said one of said support members therein.

13. The compensator of claim 1 wherein said pivot means comprises a portion of reduced cross section formed within said body member for facilitating angular deflection about a predetermined pivot point.

14. An alignment compensator for use with a linear bearing mounted on a first support member aligned substantially parallel with a second support member, the first and second support members supporting a movable carriage, said compensator comprising:
a first support element for attachment to said movable carriage;
a second support element for attachment to an exterior portion of the linear bearing; and
pivot means pivotally connecting said first and second support elements for providing lateral compensation between said first and second support members via pivotal movement about a pivot point spaced apart from said linear bearing.

15. The compensator of claim 14 wherein said pivot means comprises at least one hinged joint.

16. The compensator of claim 14 wherein said pivot means comprises a spherical joint.

17. The compensator of claim 16 wherein said spherical joint comprises a ball and socket joint.

* * * * *